United States Patent [19]

Riggs

[11] Patent Number: 4,858,939
[45] Date of Patent: Aug. 22, 1989

[54] BIT RETENTION AND RELEASE MECHANISM

[75] Inventor: James J. Riggs, Bryan, Ohio

[73] Assignee: The Aro Corporation, Bryan, Ohio

[21] Appl. No.: 225,614

[22] Filed: Jul. 26, 1988

Related U.S. Application Data

[63] Continuation of Ser. No. 12,257, Feb. 9, 1987, abandoned.

[51] Int. Cl.$^4$ .................................... B23B 31/06
[52] U.S. Cl. ................................ 279/75; 279/22; 279/80
[58] Field of Search ............... 279/22, 30, 75, 80; 173/48

[56] References Cited

U.S. PATENT DOCUMENTS

| 2,010,210 | 8/1935 | Witt | 279/30 |
| 3,398,965 | 8/1968 | Cox | 279/30 |
| 3,436,086 | 4/1969 | Glenzer | 279/30 |
| 3,985,368 | 10/1976 | Better et al. | 279/75 |
| 4,209,182 | 6/1980 | Sheldon | 279/30 |

Primary Examiner—Donald R. Schran
Assistant Examiner—James L. Wolfe
Attorney, Agent, or Firm—Allegretti & Witcoff, Ltd.

[57] ABSTRACT

A mechanism is disclosed for selectively releasing or retaining a bit in a rotary power tool. The mechanism includes a tool housing having an interior bore. A spindle, mateable with the bit, is mounted within the bore. A tubular release sleeve is also mounted within the bore, and is slidable between a retention position and release position. A bushing is positioned within the bore between the sleeve and the housing, with its exterior surface contacting the bore. A retention key is mounted within the spindle. The key is adapted to cooperate with the release sleeve to extend into a circumferential groove in the bit when the sleeve is in the retention position, and move away from that groove when the sleeve is in the release position. A spring is used to bias the release sleeve into the retention position, and a pin is mounted on the tool housing to hold the bushing within the housing.

9 Claims, 2 Drawing Sheets

BIT RETENTION AND RELEASE MECHANISM

This application is a continuation of application Ser. No. 012,257, filed Feb. 9, 1987 now abandoned.

BACKGROUND OF THE INVENTION

This invention relates to release mechanisms for power tool bits. More particular, it relates to an improved mechanism for connecting and disconnecting bits from rotary power tools, such as air or electrically powered screwdrivers and nut setters, and for exchanging the entire bit holding mechanism of rotary power tools.

Rotary power tools, including air powered or electrically driven screwdrivers and nut setters, have long been used in industrial assembly operations. Such rotary tools have been produced in many varieties. They are typified by the disclosures in such patents as DePagter, U.S. Pat. No. 4,078,618 issued Mar. 14, 1978 for a "Torque Controller Shutoff Mechanism"; Wallace, U.S. Pat. No. 4,071,092 issued Jan. 31, 1978 for a "Pneumatic Screwdriver with Torque Response Shut-Off"; Dudek, U.S. Pat. No. 3,734,515 issued May 22, 1973 for a "Power Wrench with Interchangeable Adapters"; Sorensen, U.S. Pat. No. 3,129,642 issued Apr. 21, 1964 for a "Pneumatically Operated Tool"; and British Pat. No. 1,117,583 issued June 19, 1968 for "Improvements in or relating to Fluid Operated Tools". Such rotary power tools for industrial applications usually consist of a motor or other drive mechanism (frequently powered by a high pressure air source), a bit driven by the drive mechanism, a clutch mechanism to engage the drive, and a release mechanism to allow the exchange of different sizes and kinds of bits. This invention is directed to an improved form of a release mechanism.

Many different release mechanisms have been developed in the prior art. Each allows bits to be quickly exchanged so that different bits may be easily used by the same tool in the same assembly operation. Such bit release mechanisms conventionally employ a ball cooperating with an annular groove that is machined in the shaft of the bit. The ball usually cooperates with a sleeve mounted outside of the power tool's housing. The sleeve typically has an internal ring or similar structure that forces the ball into the annular groove of the bit, thereby preventing the bit from being released from the tool. The ball may normally be moved away from the bit's groove by sliding the sleeve along the exterior of the tool's housing. The sleeve's movement removes the ring from vicinity of the ball and allows the bit to slide from the tool without hinderance from the ball. Such tools conventionally use an internal coil spring to hold the sleeve ring in position over the ball. The spring and sleeve then retain the ball in the bit's annular groove, and the bit is then held within the tool during normal tool use.

An example of the above described conventional release mechanism is disclosed in DePagter, U.S. Pat. No. 4,078,618. In such mechanisms, the shafts of the bits are all constructed in standard size and configuration (usually with a hexagonal cross section at the bit's lower end) so that a variety of different bit sizes and types may be inserted within a single tool.

While the conventional power screwdrivers and nut setters described above allow relatively easy exchange of bits, they often encounter greater difficulty in adapting the tool for use with substantially different kinds of bits, especially bits having attachments. For example, rotary powered tools are often used with an attachment called a "finder" (either magnetic or nonmagnetic) that is mounted on the tool around the bit. Finders are well known to perhaps of skill in the art, and allow quick placement of the bit on a screw or nut, and consequent faster assembly operations.

In instances where attachments such as finders are used, conventional bit retainer mechanisms may be inadequate, since conventional mechanisms often do not easily allow different sizes or shapes of finders to be inserted into the retention retainer mechanism. In other circumstances, attachments of an entirely different sort are desired to be placed on the end of a power tool, so that complete replacement of the retention mechanism may be desirable. Conventional bit retainers with external retention sleeves usually do not lend themselves to an easy exchange of mechanisms. If an assembly operation requires different attachments, several different models of tool must be used, each corresponding to a particular kind of bit or attachment. Likewise, tool manufactures must develop several different models of tools to hold the different attachments.

One solution to the problem is disclosed by Sheldon, U.S. Pat. No. 4,209,182 issued June 24, 1980 for a "Bit Retainer for Screwdriver". The Sheldon patent discloses a bit release mechanism having a removable internal sleeve. The sleeve cooperates with a ball in the conventional fashion to allow removal of a bit. However, because the internal sleeve is removable, different sleeves adapted to hold different release mechanisms corresponding to different attachments can be placed in the tool when desired. Additionally, the internal sleeve arrangement allows mechanism such as finders to extend around the bit and into the interior of the sleeve, if necessary.

The Sheldon mechanism, unlike conventional release mechanisms, does not use a spring-biased sleeve. Instead, it uses an unbiased sleeve that is positioned in the tool housing by a camming action between a pin held by a leaf spring and shoulders that are machined into the external surface of the sleeve. Although the Sheldon mechanism is effective in allowing both the exchange of bits and the removal and interchange of sleeves, that mechanism still is not ideal, because substantial difficulties can arise in securing the unbiased sleeve within the tool. For example, frequent operation of the mechanism, or frequent removal of the pin, can reduce the pressure exerted by the leaf spring on the pin, thereby making the mechanism less capable of retaining the sleeve in the tool. An improved mechanism allowing the advantages of the Sheldon patent but preventing its disadvantages is therefore desirable.

OBJECTS OF THE INVENTION

Accordingly, it is an object of this invention to provide a bit retention and release mechanism for a powered rotary tool such as a screwdriver or nut setter.

Another object of this invention is to provide a bit retention and release mechanism that allows easy and quick exchange of bits in a single tool.

A further object of this invention is to provide a bit retention and release mechanism that allows removal of the entire mechanism from the tool and replacement of that mechanism with a release mechanism of a different character.

An additional object of this invention is to provide a bit retention and release mechanism for a powered tool that is simple to use and reliable in operation.

Yet another object of this invention is to provide a bit retention and release mechanism that effectively secures the release mechanism within the tool housing.

Still another object of this invention is to provide a bit retention and release mechanism that has an extended operative life.

Yet a further object of this invention is to provide a bit retention and release mechanism that will not unintentionally operate due to normal wear or stress on its parts.

SUMMARY OF THE INVENTION

These and other objects of the invention are obtained by providing a mechanism for selectively releasing or retaining a bit in a rotary power tool. The bit is of the kind having a shaft, with a groove machined therein and positioned circumferentially about the shaft. The mechanism includes a tool housing having an axis and interior bore aligned with the axis. A spindle mateable with the bit and aligned with the axis is rotatably mounted within the tool housing bore. A generally tubular release sleeve is also mounted within the bore and is configured to be slidable between a retention position and release position. A bushing is mounted within the bore between the sleeve and the housing; the bushing is adapted to prevent complete removal of the sleeve from the housing bore. A retention ball is mounted within the spindle to cooperate with the release sleeve. The ball will lock within the groove of the bit when the sleeve is in the retention position and will move away from the bit when the sleeve is in the release position. A spring is used to bias the release sleeve in the retention position, and a pin is mounted on the tool housing to hold the bushing within that housing.

BRIEF DESCRIPTION OF THE DRAWINGS

Four embodiments of the present invention are disclosed in the detailed descriptions and drawings. The drawings include six figures used to illustrate those embodiments, wherein like reference numerals in each drawing refer to like parts of the various embodiments. The drawings are briefly as follows.

In the detailed description that follows, directional terms such as upper, lower, inner, outer and the like are used to relate the invention to the positions shown in the accompanying figures. Terms of this type are used for the convenience of the person of ordinary skill in the art, and are not intended to limit the scope of any patent issuing on the present invention, unless expressly included in the claims.

DETAILED DESCRIPTION OF THE PREFERRED EMBODIMENT

Figure 1:
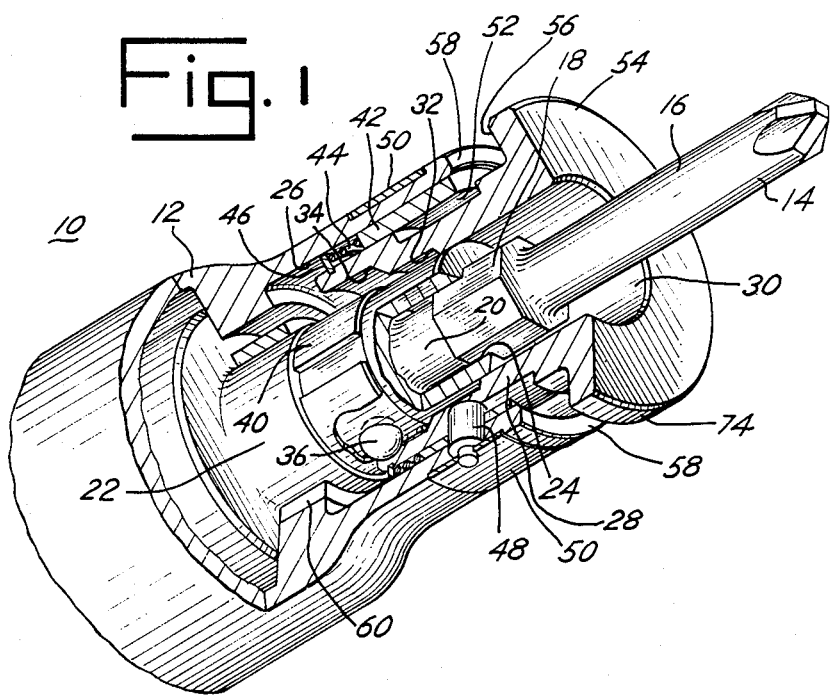
FIG. 1 is a cutaway perspective view of a principle embodiment of an air tool incorporating the invention.
Figure 2:
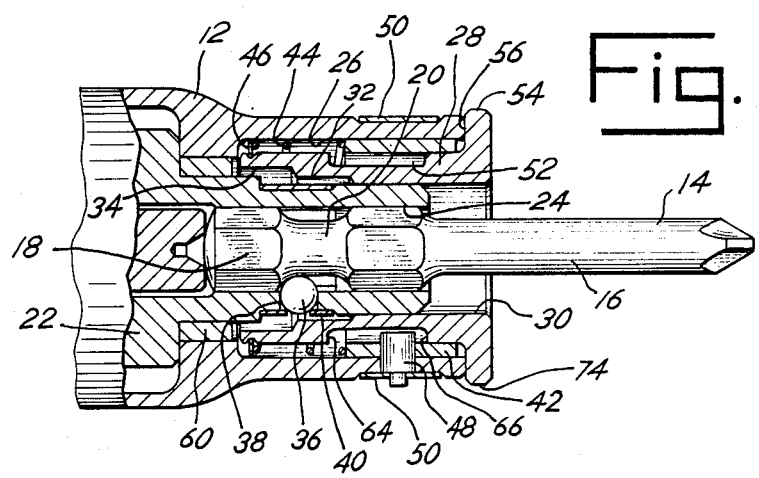
FIG. 2 is a side cross sectional view of the embodiment of FIG. 1, showing the release sleeve in the retention position.

Referring now to the drawings and particularly to FIGS. 1 and 2, the invention is a Bit Retention and Release Mechanism 10 for a power tool. The mechanism is enclosed in a tool housing 12, which also encloses the other elements of the tool, such as the clutch and drive motor (not shown). The retention and release mechanism 10 is used to allow a bit 14 to be removed and another placed within the mechanism. The bit has an upper end 16 and a lower end 18. The lower end 18 is preferable of a hexagonal cross section of a standard size and shape that allows bits made by different manufactures to be interchangeably used in a variety of tools. The bit 14 is preferable of the conventional design having a circumferential groove 20 in its lower hexagonal end 18.

The invention is preferably used in the kind of power tool having a spindle 22 connected to a clutch mechanism (not shown). The spindle 22 has an interior bore 24 that is hexagonal in shape, matching the shape of the hexagonal end 18 of the bit 14. The spindle 22 rotates in a tool housing bore 26, which also encompasses the majority of the remaining elements of the mechanism 10.

The spindle 22 is surrounded by a release sleeve 28. That release sleeve defines three concentric bores: a first bore 30 corresponding to the diameter of the spindle 22, an intermediate bore 32, and a wide bore 34. The intermediate and wide bores of the sleeve 22 cooperate with a ball key 36 to secure the bit 14 in the spindle 22. The ball key 36 is mounted in an opening 38 in the spindle 22. In the preferred embodiment, the ball key 36 is retained by a first leaf spring 40 surrounding the spindle 22. However, the intermediate bore 32 and wide bore 34 of the release sleeve 28 can also be sized to limit movement of the ball key 36 and prevent complete withdrawal of the ball key from the vicinity of the groove 20, thereby making the first sleeve spring 40 unnecessary.

Also contained in the housing bore 26 is a bushing 42 placed between the housing 12 and the release sleeve 28. A coil spring 44 acts between the release sleeve 28 and the bushing 42. In the preferred embodiment, the coil spring 44 connects to the release sleeve 28 by resting against a retaining ring 46 affixed to the release sleeve 28, near the sleeve's inner end. Also in the preferred embodiment, the coil spring 44 acts in compression, so that it exerts pressure against both the retaining ring 46 and bushing 42.

Figure 6:
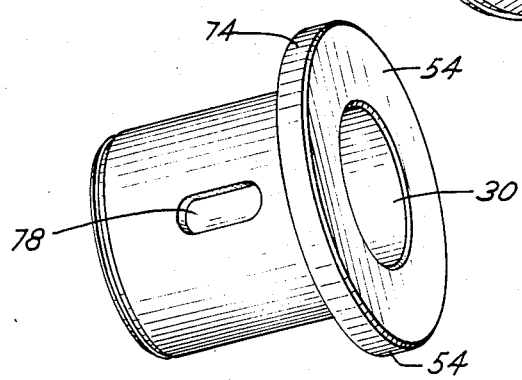
FIG. 6 is a perspective view of the preferred embodiment of a release sleeve suitable for use in either the configuration of FIG. 1 or the configuration of FIG. 4.

The bushing 42 is, in the preferred embodiment, held within the tool housing 12 by a pin 48. The pin extends through the housing 12 into the bushing 42, and is removable. The pin 48 is retained in the bushing 42 by a second sleeve spring 50 extending around the tool housing 12. Conventional "stock" pins are normally of such lengths that they extend beyond the bushing 42 and therefore into the release sleeve 28. To prevent interference between the release sleeve 28 and the pin 48, the release sleeve may include a circumferential groove 52 or a slot (not shown). Although the mechanism can be fabricated with either a slot or a groove, a slot type configuration as shown in FIG. 6 is preferred. When a groove is used, the depth of the groove 52 is preferably such that there is no contact between the pin 48 and the groove 52.

In the embodiment of FIGS. 1 and 2, the release sleeve 28 includes a flange 54 of greater diameter than the tool housing bore 26. The flange provides a surface 56 that can rest against the end 58 of the tool housing 12, and thereby limits the inward travel of the release sleeve 28 in the housing bore 26. As illustrated in FIGS. 1-4, the mechanism also includes a bearing 60 between the spindle 22 and the tool housing 12. In the preferred embodiment, the bearing 60 is configured as a bushing allowing sliding contact between the rotating spindle 22, the bearing 60 and the tools housing 12.

Figure 3:
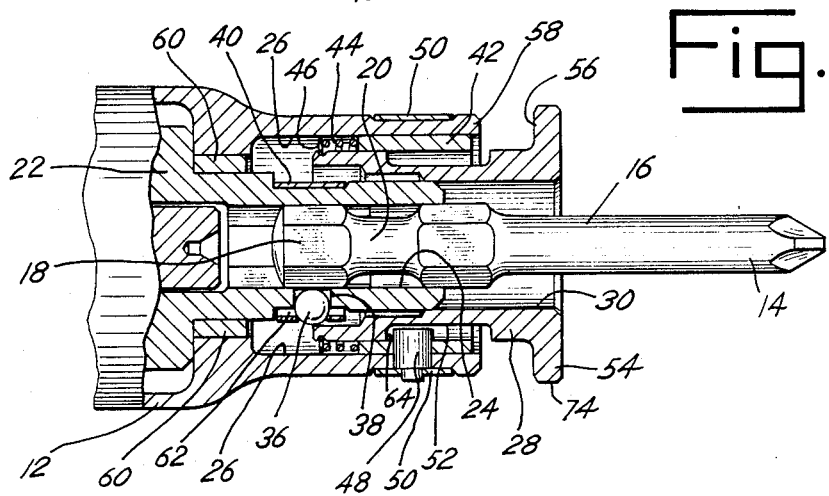
FIG. 3 is a side cross sectional view of the embodiment of FIGS. 1 and 2, showing the release sleeve in the release position.

Operation of the retention and release mechanism is illustrated in FIGS. 2 and 3. FIG. 2 shows the retention position of the release sleeve 28, with the bit 14 secured within the tool mechanism 10 by pressure of the ball key 36 against the bit's groove 20. The tool is only used when a bit is retained in the mechanism 10, meaning that the tool will not be used when the release sleeve 28 is not in the retention position. The ball key 36 is held in contact with the groove 20 primarily by action of the first leaf spring 40. However, when the sleeve 28 is in the retention position, the ball key 36 can only move away from the groove 20 a distance that is sufficient for the ball key to contact the release sleeve's intermediate bore 32. That distance is insufficient to allow the bit 14 to slide out of the spindle 22.

The release position of the mechanism is illustrated in FIG. 3. To release a bit 14 from the spindle 22, the tool operator must grasp the flange 54 of the release 28 and pull the sleeve out of the tool housing 12 a sufficient distance such that the sleeve's wide bore 34 is around the ball key 36. The wide bore 34 allows greater movement of the ball key 36 from the groove 20, so that the operator may then pull the bit 14 from the spindle. While the bit is being pulled from the spindle 22, the first leaf spring 40 extends away from the spindle, leaving a gap 62 between the spindle and leaf spring 40. In alternative embodiments that do not employ the first leaf spring 40, the ball key 36 will not fall out of the spindle opening 38, because the distance between the sleeve wide bore 34 and the spindle bore 24 is insufficient to allow the ball key 36 to pass.

Operation of the bit release mechanism requires movement of the release sleeve 28 against the pressure of the coil spring 44. Once the tool operator has removed a bit 14 from the spindle 22, the sleeve 28 will be pushed back into the tool housing 12 by action of the coil spring against the retaining ring 46, unless the operator continues to hold the release sleeve 28 in the release position. The same spring action of the coil spring 44 acts to maintain the bit 14 within the spindle 22, when the release sleeve 28 is in the retention position, by biasing the release sleeve 28 fully into the tool housing 12.

The limits of travel of the release sleeve 28 are defined for inward movement by the contact of the flange surface 56 against the tool housing end 58, and for outward movement by the maximum compression of the coil spring 44 between the retaining ring 46 and bushing 42 when the sleeve is in the release position. In the preferred embodiment, the pin 48 never contacts the release sleeve 28 and does not act to limit the sleeve's travel. However, in alternative embodiments, the width of the sleeve groove 52 can be reduced so that the pin 48 contacts either the internal edge 64 of the groove 52 or the outer edge 66 of the groove 52, or both. Of course, when the mechanism is constructed with a shorter pin 48 and the groove 52 is eliminated, the pin cannot act to limit travel of the release sleeve 28.

Complete removal of the release and retention mechanism can be accomplished by removing the pin 48 from the tool housing 12. The pin is preferably secured to the second leaf spring 50, and may be removed by opening the leaf spring 50 a distance sufficient to pull the pin 48 from the tool housing 12. When so removed, the bushing 42 is no longer held in place and the release sleeve 28, bushing 42, retaining ring 46 and coil spring 44 can all slide out of the tool housing 12. In that manner, an entirely different sleeve, bushing and spring arrangement can be inserted within the same housing 12.

Figure 4:
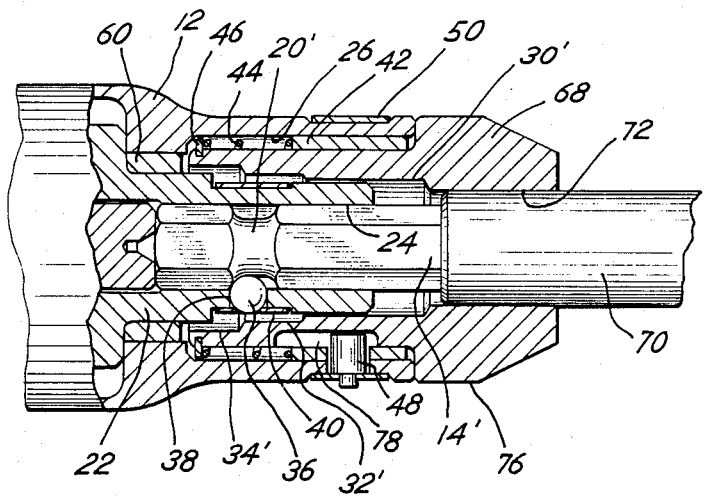
FIG. 4 is a side cross sectional view of an alternative embodiment of the invention, showing a finder mounted in the release sleeve.

Referring now to FIG. 4, an embodiment of the invention is shown using a different release sleeve. The embodiment of FIG. 4 uses the same tool housing 12, spindle 22, bushing 42, coil spring 44, ball key 36, and pin 48 as the embodiments of FIGS. 1-3. However, an alternative release sleeve 68 is mated with the bushing, coil spring and retaining ring. The alternative sleeve 68 is similar to the release sleeve 28 in that it has three concentric bores for interaction between the spindle 22 and the ball key 36: a first bore 30' corresponds to the diameter of the spindle, an intermediate bore 32' acts to retain the ball key 36 against the groove 20' and a wide bore 34' acts to allow the ball 36 to move away from the groove 20', when the sleeve 68 is in the release position. The alternative sleeve 68 operates to release the bit 14' in the same manner as illustrated for the embodiments of FIGS. 1-3.

The embodiment of FIG. 4 illustrates a sleeve 68 adapted for use with a finder 70, and shows how a different kind of sleeve having a forth bore 72 can be incorporated in the same mechanism. A variety of other kinds of sleeves can also be placed in the same tool, using the same bushing and spring arrangement, simply by pulling the pin 48 from the tool housing 12 and removing the release sleeve.

In any embodiment of the invention, removal of the release sleeve can be made easier by providing a knurled surface on the external portion of the sleeve. In the embodiments of FIGS. 1-3, that knurled surface would be on the outer edge 74. For the embodiment of FIG. 4, that knurled surface would be on edge 76. The embodiment of FIG. 4 also illustrates the preferred arrangement for the release sleeve. In the preferred embodiment, the release sleeve 68 does not have a circumferential groove, but instead has a slot 78 that is large enough to allow the pin 48 to extend into the release sleeve 68 without the bottom of the pin contacting the bottom of the slot. Of course, as in the embodiment of FIGS. 1-3, the slot can be sized large enough so that the pin never contacts the sides of the slot, meaning that the pin does not limit travel of the release sleeves 68. Alternatively, the slot can also be made short enough so that the limits of travel are set by the pin in the slot. In the embodiment of FIG. 4 using slot 78, the existence of the pin 48 in that slot will prevent the release sleeve 68 from rotating, and thereby prevents wear on the pin 48 if the pin extends to contact the surface of the sleeve. The slot configuration also allows the sleeve to be non-rotating, should that feature be desired. In some applications, rotation is not undesirable, so that use of a pin 48 in a slot 78 to prevent rotation is not necessary.

Figure 5:
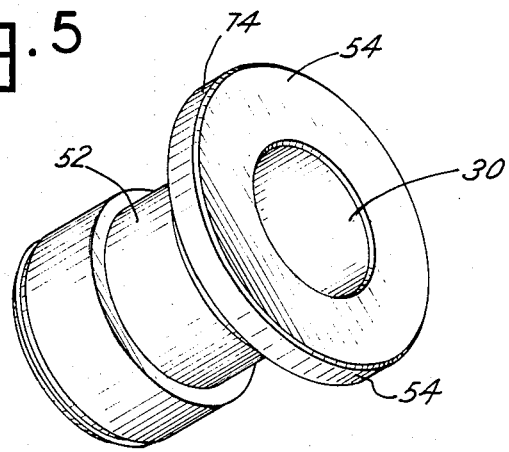
FIG. 5 is a perspective view of the release sleeve of FIGS. 1, 2, and 3.

FIGS. 5 and 6 illustrate either a slot or a groove placed on the external surface of a release sleeve like that used in the embodiments of FIGS. 1–3. Although the preferred embodiment of the mechanism uses a slot, either a slot or groove can be used in either the sleeve of FIG. 1 or the sleeve of FIG. 2. Indeed, the slot 78 illustrated in FIG. 6 may be used in many embodiments other than that shown in FIG. 4. Any combination of slots, grooves and other features may be used in a variety of different kinds of configurations of release sleeves, so long as all of the sleeves have the three concentric grooves that provide interaction between the sleeve, spindle, and ball key.

Finally, the terms used in the claims and specification should not be construed in their most limited sense. For instance, the term "power tool" should be construed to include any type of device capable of accepting a removable bit, and need not be limited to rotary power tools or air powered tools. The term "pin" should not be limited to the specific configuration of pin shown in the illustrations, but can include any mechanism, including screws and bolts, that removable secures a bushing within a tool housing. Similar variations are allowable in the remaining terms used in the specification and claims.

What is claimed is:

1. A mechanism for selectively releasing or retaining, in a rotary tool, a bit with a shaft having a groove on the shaft, comprising, in combination:

a tool housing having an axis and an interior bore aligned with the axis;

a spindle mateable with a bit and aligned with the axis, the spindle being rotatably mounted within the tool housing bore and adapted to rotate the bit when the bit is inserted into the housing bore;

a tubular release sleeve mounted within the tool housing bore and slidable between a retention position and a release position, said sleeve having an outside surface;

a generally annular, removable bushing having an interior and an exterior surface, said bushing positioned within the bore between the sleeve and the housing with at least a part of the exterior, circumferential surface thereof contacting the inside surface of the bore, and at least a part of the interior circumferential surface slidably contacting the outside of said sleeve, said bushing being adapted to prevent complete removal of the sleeve from the housing bore without removing the bushing;

a retention key mounted within the spindle and adpated to cooperate with the release sleeve to extend into the groove of the bit and retain the bit in the spindle when the sleeve is in the retention position, and move out of the groove in the bit, allowing the bit's release from the spindle, when the sleeve is in the release position;

means for biasing the release sleeve in the retention position said means for biasing positioned on the outside surface of the release sleeve intermediate the bushing and sleeve; and a removable retention pin mounted on the tool housing and adapted to project through housing to removably retain the bushing within the housing, whereby the bushing removably retains the sleeve and may limit, at least in part, the travel of the sleeve in the bore.

2. A mechanism as claimed in claim 1, wherein the release sleeve extends over the retention key and further comprises three progressively larger concentric bores, the smallest sleeve bore corresponding to the diameter of the spindle, the largest sleeve bore extending over the key when the sleeve is in the release position to allow the retention key to move away from the groove of the bit, and the intermediate sleeve bore extending over the key when the sleeve is in the retention position to hold the key in the bit's groove.

3. A mechanism as claimed in claim 1, wherein the means for biasing the sleeve is a coil spring mounted within the housing bore and acting between the release sleeve and the bushing.

4. A mechanism as claimed in claim 3, wherein the release sleeve further comprises a retaining ring fixed to the sleeve and extending circumferentially around the release sleeve's exterior, and wherein the spring rests against the retaining ring and extends around the sleeve.

5. A mechanism as claimed in claim 1, wherein the release sleeve includes a grip portion having a diameter greater than and extending outside the housing bore.

6. A mechanism as claimed in claim 5, wherein the grip portion defines a bore concentric with the housing bore and is sized to accept a bit extension structure.

7. A mechanism as claimed in claim 1, wherein the retention pin extends through the bushing into the sleeve.

8. A mechanism as claimed in claim 7, wherein the sleeve includes an exterior circumferential groove preventing all contact between the pin and the sleeve.

9. A mechanism as claimed in claim 7, wherein the sleeve includes a longitudinal slot at the pin's location sized to allow axial motion of the sleeve between the retention and release positions without contact of the pin with the sleeve.

* * * * *